US006911899B1

(12) United States Patent
Crochon et al.

(10) Patent No.: US 6,911,899 B1
(45) Date of Patent: Jun. 28, 2005

(54) METHOD AND DEVICE FOR REMOTE IDENTIFICATION

(75) Inventors: Elisabeth Crochon, Poisat (FR); François Vacherand, Le Pout de Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/319,626

(22) PCT Filed: Dec. 15, 1997

(86) PCT No.: PCT/FR97/02299

§ 371 (c)(1),
(2), (4) Date: Jun. 9, 1999

(87) PCT Pub. No.: WO98/27508

PCT Pub. Date: Jun. 25, 1998

(30) Foreign Application Priority Data

Dec. 16, 1996 (FR) .......................... 96 15434

(51) Int. Cl.⁷ ................................ H04Q 5/22
(52) U.S. Cl. .................. 340/10.2; 340/10.1; 340/10.3; 340/10.4; 340/10.31; 340/825.69; 340/825.72; 340/10.5
(58) Field of Search ........................ 340/10.2, 825.54, 340/10.1, 10.3, 10.4

(56) References Cited

U.S. PATENT DOCUMENTS 5,266,925 A  * 11/1993  Vercellotti et al. .......... 340/572
5,339,073 A  * 8/1994   Dodd et al. ................. 340/5.61
5,751,570 A  * 5/1998   Stobbe et al. ................ 700/11
5,856,788 A  * 1/1999   Walter et al. .............. 340/10.2
5,864,706 A  * 1/1999   Kurokawa et al. ..... 395/800.35

FOREIGN PATENT DOCUMENTS

| EP | 0 494 114 A2 | | 7/1992 | |
| EP | 0494114 | * | 8/1992 | ............ G07C/9/00 |
| WO | WO 93/23767 | * | 11/1993 | ........... G01S/13/80 |
| WO | WO 94/27353 | | 11/1994 | |

* cited by examiner

Primary Examiner—Michael Horabik
Assistant Examiner—Vernal Brown
(74) Attorney, Agent, or Firm—Pearne & Gordon LLP

(57) ABSTRACT

This method of identification between an interrogation system (1) such as an arch and labels (E) placed on objects to be identified and called upon to pass through the interrogation field (2) functions by the sending of control signals from the interrogator (1) to the labels (E) so that the latter transmit their codes. The known interrogation mode in which the codes are supplied bit by bit and the labels responding simultaneously are inhibited in turn so that only one is active and identified at any one time, is preceded by an identification test during which all the labels send their code at one go all at the same time, which allows immediate identification if only one label is present. When a label has been identified, the interrogator (1) isolates it in order to exchange particular information with it.

7 Claims, 4 Drawing Sheets

METHOD AND DEVICE FOR REMOTE IDENTIFICATION

The invention relates to a method for the remote identification of objects referred to as labels, normally movable, by an interrogation apparatus whose interrogation field they can enter before leaving in a random fashion. It also relates to a corresponding installation.

Such methods can be applied for example to the checking of personnel access, or the identification of luggage or objects on a conveyor belt or products or tools on a production line; other usual applications relate to payment for goods at a supermarket checkout or motorway tolls, by automatically debiting an account. A prior example is described in the patent WO-A-92-22040 of the same applicant and shows how labels present in the interrogation field were caused by the interrogator to successively supply their codes, which made it possible to identify them. The labels thus responded to a control signal of the interrogator and, when a label detected that the code currently being identified was different from its own, it inhibited itself momentarily, and the identification cycle continued with the other labels until there remained only one uninhibited label corresponding to the identified label. Inhibition of the labels means in fact that they no longer emit a signal and therefore become mute. At the end of an identification cycle, at a single command from the interrogator, the identified label was inhibited definitively and the other labels lifted their momentary inhibition. The identification procedure was reinitialised in order thus to identify another label. These operations were repeated as many times as necessary for identifying all the labels separately.

This method was subject to certain failings, the most important of which is perhaps that it was purely passive, that is to say it merely noted the presence of labels in the interrogation field, making it possible only to record this presence or to indicate it to another system or an operator. It was also fairly slow: in particular, an off-load interrogation cycle was always implemented after all the labels had been identified in order to ensure that there were no more of them. Because of this slowness, the use of this method in a dynamic environment carries the risk of not identifying any labels passing through the interrogation field too quickly.

Taking these circumstances into consideration, an essential object of the invention is therefore to allow the application of an identification method of the type of the prior patent to more numerous situations, in which the labels can be movable, and where the interrogator carries out specific processings on the label: a reading of the content of the label distinct from the code and/or the writing of information. It will thus be possible to update the conditions for access to the label carriers, to check the correct routing of luggage or to enter a passage time on a label comprising a historical file. Another object of the invention is to accelerate the identification process in order to make it more effective and to reduce the risk of a lack of check on a label passing too quickly.

In its most general form, the method for the remote identification of labels provided with a distinctive code according to the invention—the labels being situated in a field of an interrogation apparatus and the interrogation consisting of sendings and receivings of signals between the interrogator and labels, the labels being able to be inhibited—comprises steps of identification of the labels by successively reading their codes and then final inhibition of the identified labels as long as they remain in the field; it is characterised in that it comprises, between the identification and final inhibition of a label, a passage of information between the interrogator and this label, the other labels being temporarily inhibited. The passage of information is advantageously controlled by the sending of an identification stoppage signal by the interrogator, the identification stoppage signal containing all or part of the code of the said label.

Before the label identification steps, which consist of successively reading their codes in fragments, preferably bit by bit, an improvement to the invention can consist of a prior identification step in which the labels which are not definitively inhibited send together all their code in response to a signal of the interrogator. This prior identification step is particularly adapted to a single-label context, a context which is frequent in the type of application envisaged. This improvement then avoids interrogation fragment by fragment. Another improvement consists of optimising the procedure of the prior patent of identification fragment by fragment. At each identification step, the sending of the sequence of fragments will take place either from the least significant fragment to the most significant fragment, or vice versa.

The identification device therefore comprises an interrogation apparatus and labels, which each comprise signal transceivers, converters converting signals into logic information and vice versa and logic processing means for the information; the labels also each comprise a distinctive code, and the interrogation apparatus a catalogue of signals. The means by which the invention is implemented can comprise signals added to the catalogue, such as a signal initiating a passage of information between the interrogator and the identified label; a signal causing at least some of the labels to send their entire code simultaneously; or two signals controlling the sending of codes by successive fragments by the labels, the fragments following each other in one order or the reverse order according to the command chosen.

Advantageously, the fragment corresponds to a binary element or bit.

The invention will now be described in more detail with the help of the following figures.

Figure 1:
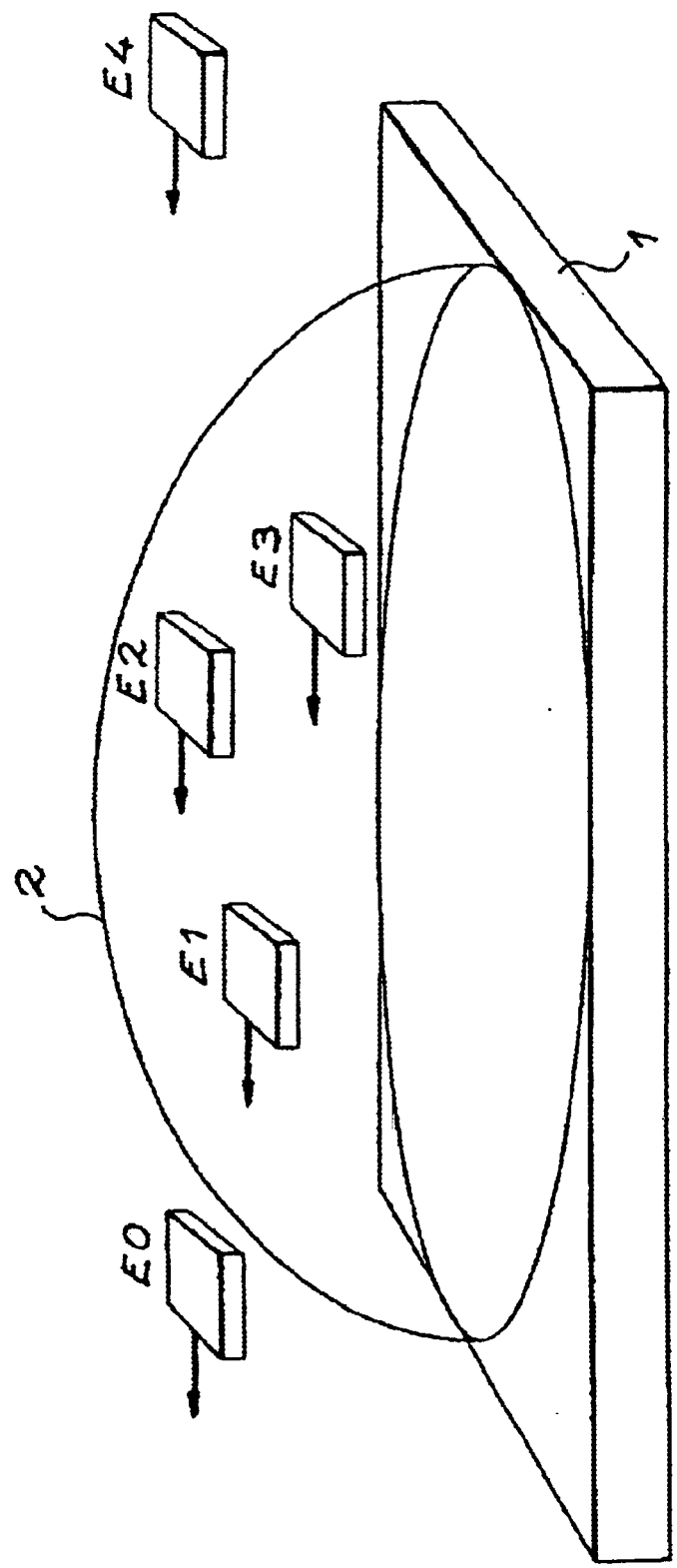
FIG. 1 depicts a diagram of the invention depicting a practical situation.

FIG. 1 therefore depicts an interrogator 1 able to communicate with labels in the range of an identification field 2 whose limits are defined amongst other things by the power of the sending elements and the sensitivity of the receivers of the interrogator 1. Labels E pass in a random flow, continuous or otherwise, in front of the interrogator 1 and pass through the identification field 2; here five of them have been shown, referenced from E0 to E4, where the first E0 has already left the identification field 2, the following three E1 to E3 are situated therein and the last one E4 is to enter it. The labels E are fixed to objects or persons, not depicted, according to the application chosen, and the interrogator 1, symbolised here by a plate, can take a different form; it can be a case of an arch delimiting an opening under which the carriers of labels E are obliged to pass.

Figure 2:
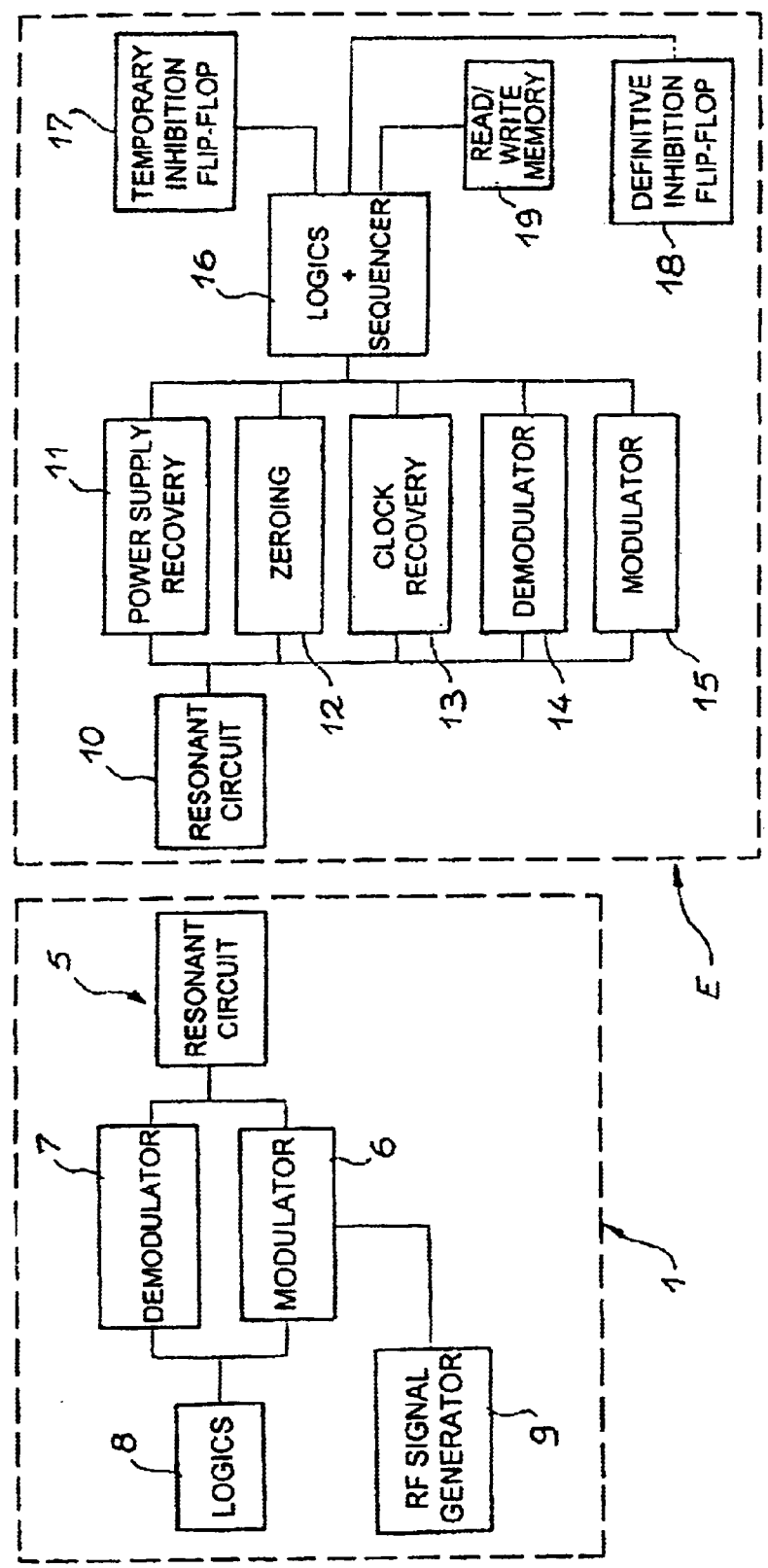
FIG. 2 depicts side by side the main elements of the interrogation apparatus and of a label.

FIG. 2 will now be commented on. The interrogator comprises: a transceiving resonant circuit 5, comprising in particular an antenna and constituting the primary circuit of an inductive coupling between the interrogator 1 and the labels E; a modulator 6 and a demodulator 7 for converting a signal pattern into a modulated signal transmitted by the resonant circuit 5, and vice versa; logic means 8 for controlling the steps of the identification transaction between the interrogator 1 and the labels E, producing binary signals which they next convert into single patterns supplied to the modulator 6, and finally collecting the signals which they receive from the demodulator 7 and which come from the label E in order to convert them into binary information; finally, there is a radiofrequency signal generating module 9, connected to the modulator 6, which controls the functioning of the labels E.

The latter also comprise a resonant circuit 10, having an antenna forming the secondary circuit of the inductive coupling between the interrogator and the label and which is coupled to a power supply recovery module 11 responsible for rectifying a carrier transmitted continuously by the interrogator 1, and for filtering and stabilising it at the nominal operating voltage of the electronics of the label E in order to recover the energy necessary for the functioning of the label; a zeroing module 12, verifying that a sufficient supply voltage is applied to the label E for a sufficiently long time, which indicates that the label E has entered the interrogation field 2 and then enables the zeroing module 12 to initialise the logic means of the label E in order to put them in a state to fulfil their role on the information exchange transaction with the interrogator 1; a clock recovery module 13 for timing the transaction, and which arrives at this result by dividing the frequency of the carrier; a demodulator 14 extracting, from the signal received by the resonant circuit 10, a signal which can be used by the logic means of the label; and a modulator 15 for transmitting information from the label E to the interrogator 1.

These modules 11 to 15 are also connected to logic means 16 responsible for the transaction, the interpretation of the signals received from the interrogator 1, the sending of the requested signals and the sequencing of the transaction. The logic means 16 can control a temporary inhibition flip-flop 17 (also referred to as momentary inhibition) and a definitive inhibition flip-flop 18, and they finally communicate with a memory 19, which can be an EEPROM memory (a read only memory which is electrically programmable and erasable in read mode and possibly in write mode).

These logic means 16 and the logics 8 also afford the management of the timing necessary to the exchanges between the interrogator and the labels. This timing is effected by means, for example, of counters associated with clocks.

The information exchanged corresponds to binary signals. In all cases, the labels E are caused to give their codes, and, depending on what is requested of them, all at one go or bit by bit. According to a first example embodiment using a Huffman-type coding, the interrogator 1 sends six signals, four of which have three data bits and two of which have two data bits, which are indicated in Table I.

TABLE I

| Signals | Meaning |
| --- | --- |
| 111 | Start of interrogation |
| 110 | Start of identification sequence commencing with the most significant bit |
| 100 | Start of identification sequence starting with the least significant bit |
| 101 | Confirmation of identified label code |
| 00 | Reading of following bit, no label having its previous bit at 1 |
| 01 | Reading of following bit, at least one label having its previous bit at 1 |

The start of interrogation signal causes all the labels E which have not been definitively inhibited to send their codes simultaneously.

The two start of sequence signals cause the labels E which have not been definitively inhibited to give their code bit by bit, either commencing with the most significant bit (reading the code in the natural direction) or commencing with the least significant bit (reading the code from right to left). The code confirmation signal, which is followed by the code of the identified label, announces that a particular transaction will take place with this label; this confirmation signal corresponds to the transaction initialisation signal. Finally, the information of type 0 and 1 indicates that the bits equal to 1 have not been found, or on the contrary that they have been found, in the codes of the labels currently being read. On reception of this information, the labels whose previously read bit does not correspond to this said information sent by the interrogator are temporarily inhibited.

The identification method will now be given in Table II with the example of FIG. 1, which will make it possible to explain it clearly; the labels E1 to E4 have 00011, 01100, 01010 and 00111 as their code respectively; it is unnecessary to give the code of the label E0, which has left the interrogation field 2 and will no longer re-enter it. E4 will enter the field of the interrogator during the interrogation sequence.

TABLE II

| Action of interrogator 1 | State of all the labels E | Action of the labels E |
| --- | --- | --- |
| Start of interrogation (signal 111) | E1, E2, E3 in interrogation field 2 | E1, E2 and E3 return their code |
| Start of identification sequence at most significant bit (signal 110) | | No response: E1, E2 and E3 have their first bit at 0 |
| Information of type 0 (signal 00) | | E2 and E3 send, their second bit being at 1 |
| Information of type 1 | | 1 is temporarily inhibited; E2 sends, its third bit being at 1 |
| Information of type 1 | | E3 is temporarily inhibited; no sending, the labels still active (E2) having their fourth bit at 0 |
| Information of type 0 | | No sending, the labels still active (E2) having their fifth bit at zero |
| Confirmation of code 01100 (signal 10101100) Exchange of information with label E2 | | The label E2 recognises its code |
| Start of interrogation | E2 becomes inactive and E1 and E3 become active again | E2 is definitively inhibited, E1 and E3 send their code |
| Start of identification sequence at least significant bit (signal 100) | | E1 sends, its fifth bit being equal to 1 |
| Information of type 1 | | E3 is temporarily inhibited, E1 sends |
| Information of type 1 | | No sending |
| Information of type 0 | | No sending |
| Information of type 0 | E4 enters the interrogation field | No sending |
| Confirmation of code 00011 | | The label E1 identifies its code |

TABLE II-continued

| Action of interrogator 1 | State of all the labels E | Action of the labels E |
|---|---|---|
| Exchange of information with label E1 | | |
| Start of interrogation | E1 becomes inactive, E3 becomes active again, E4 becomes active | E1 is definitively inhibited; E3 and E4 send their code |
| Start of identification sequence at most significant bit | | No response |
| Information of type 0 | | E3 sends |
| Information of type 1 | E1 leaves interrogation field 2 | E4 is temporarily inhibited; no sending |
| Information of type 0 | | E3 sends |
| Information of type 1 | | No sending |
| Confirmation of code 01010 | | E3 identifies its code |
| Exchange of information with label E3 | | |
| Start of interrogation | E3 becomes inactive, E4 becomes active again | E3 is definitively inhibited; E4 sends its code |
| Confirmation of code 00111 | | E4 identifies its code |
| Exchange of information with label E4 | | |
| Start of interrogation | E4 becomes inactive | E4 is definitively inhibited |

Figure 3:
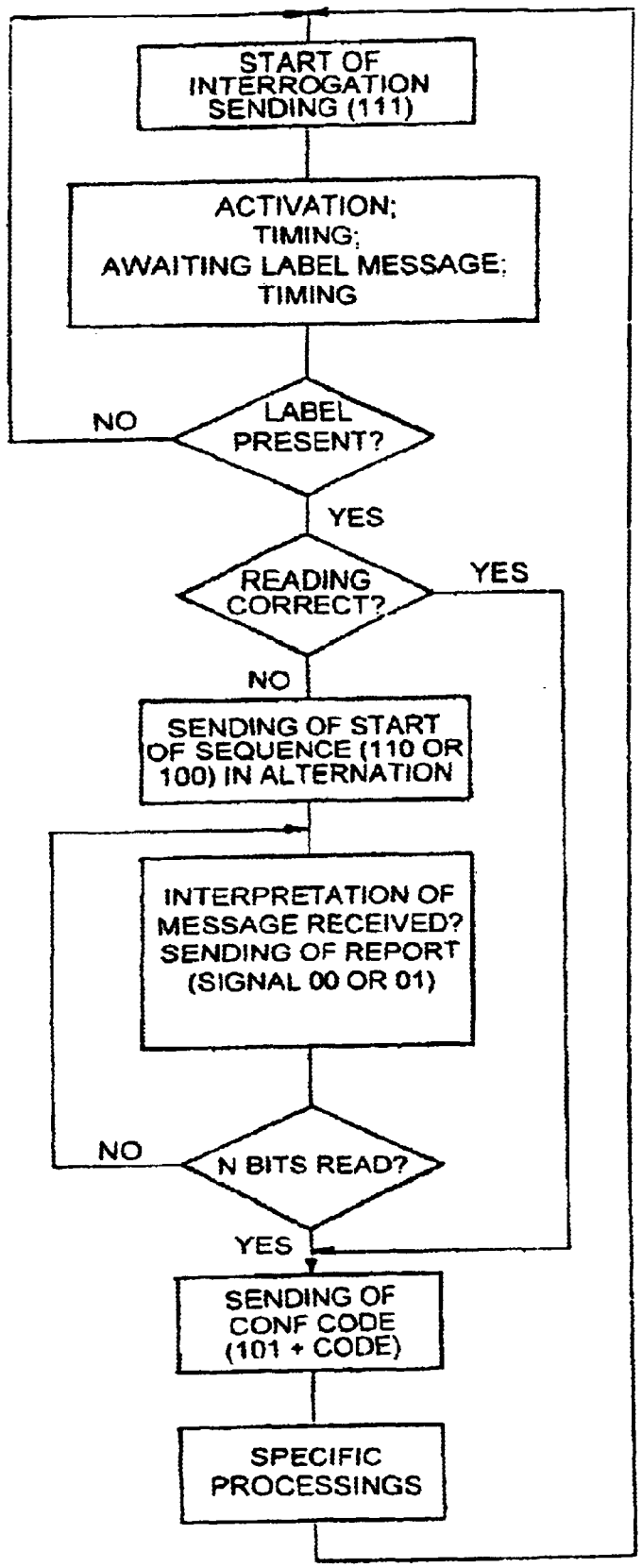
FIGS. 3 and 4 depict the operating diagrams of the interrogation apparatus and labels.
Figure 4:
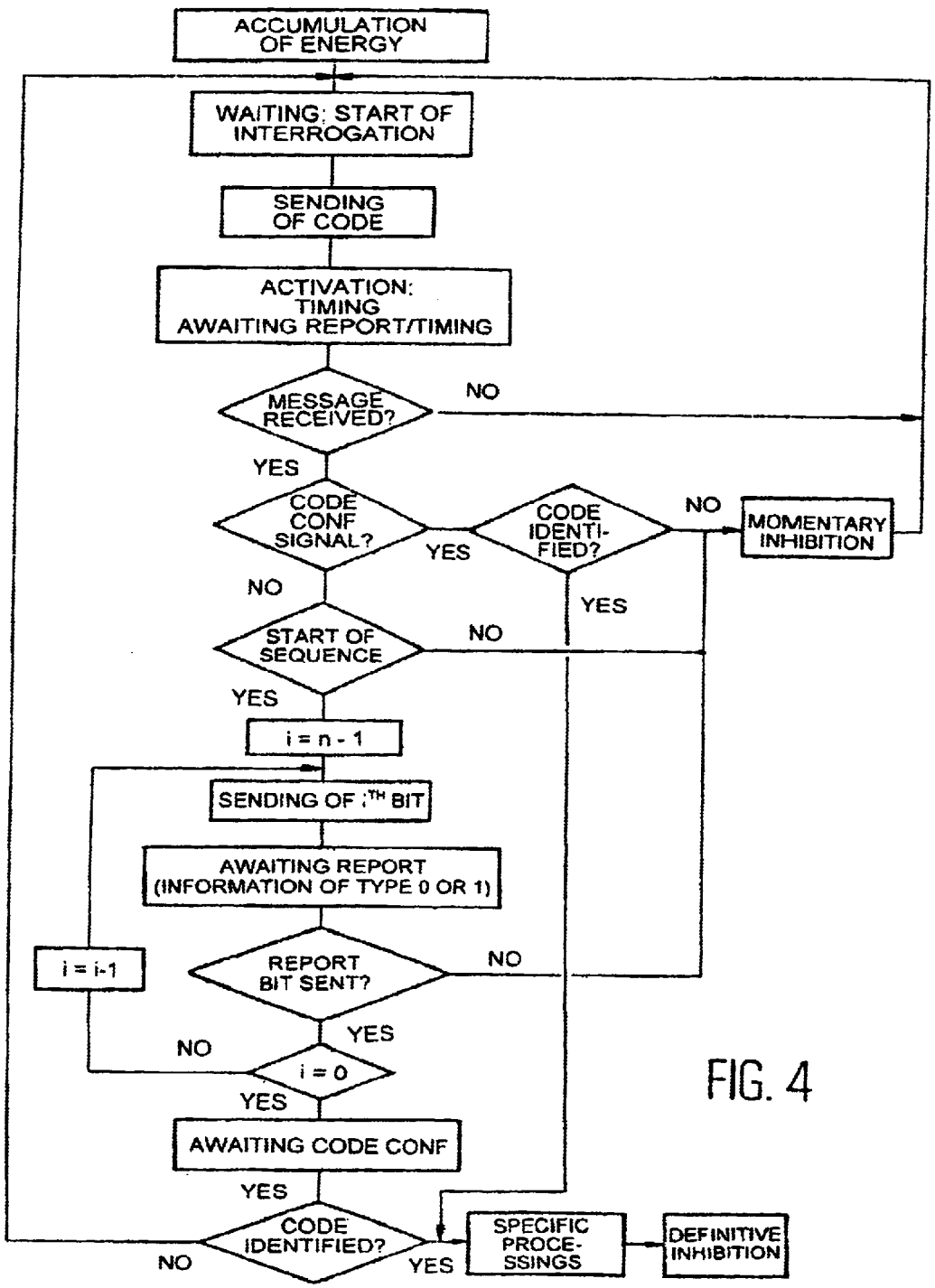

A clearer and more general presentation of the method is given by the flow diagrams in FIGS. 3 and 4 respectively with regard to the interrogator and the label.

Each identification cycle commences with a start of interrogation signal, in which the non-inhibited labels send all their identification code all at one go. This step makes it possible to recognise whether a single signal is sent, or whether on the other hand there is a superimposition of signals. In the first case, which corresponds to that of a single label E still to be identified in the interrogation field 2, the identification is immediate and it is possible to commence the passage of information between this label and the interrogator 1 without any other formality; in the contrary case, a successive identification of the labels E is carried out according to a method which resembles that of the prior patent of the applicant. This method entails a bit by bit reading of the codes and comprises sending of signals of type 0 or 1 according to whether the previously read bits of the labels currently being identified were all equal to 0 or not. When a signal of type 1 is sent, the labels whose previously read bit was equal to 0 are temporarily inhibited, and the interrogation continues only on the others. An important advantage of the invention is that the start of interrogation signal avoids having recourse to the identification sequence when there is only one label, and even better when there are no longer any at all, which was essential in the prior method to ensure that all the labels have indeed been read.

The alternation of the start of sequence signals for controlling code readings in both directions has the effect of not favouring the systematic identification of the labels E whose code is high, which can allow the others time to leave the interrogation field 2 without having been identified. The label E whose code commences with three zeros would thus take a long time to be identified if the reading of the most significant bits was always commenced with, since it would be read after the labels E2, E3 and even E4, and could therefore leave the interrogation field unperceived. When all the labels E have been identified and inhibited definitively, the start of interrogation signal does not give rise to any response and the interrogator 1 pauses before sending it once again whilst awaiting a new label E entering the interrogation field 2.

What is claimed is:

1. A method for the remote identification of labels (E) provided with a distinctive code and situated in a field (2) of an interrogation apparatus (1), by sending and receiving signals between the interrogator and the labels, the labels being able to be inhibited, comprising the following steps:

prior identification step adapted to a context with a single label, allowing the rapid identification, by reading its code, of a single label on a single signal of the interrogator when the said single label is alone in the field (2) of the interrogation apparatus (1);

label identification step of identifying the said labels by successively reading the code of each of the said labels whilst temporarily inhibiting the other labels which are not yet identified if the interrogation apparatus (1) finds that several of the labels are present at the same time in the field (2), the codes being read by fragments;

information passage step of passing information between the interrogation apparatus and the label which has just been identified; and definitive inhibition step of definitively inhibiting the label which has just been identified;

wherein the labels can enter the field (2) of the identification apparatus (1) and leave it in a random fashion, and wherein the label identification step is undertaken alternatively in one code reading direction from most significant data and then another code reading direction from least significant data for each of the labels.

2. A remote identification method according to claim 1, further comprising a label identification confirmation step, which precedes and influences the information passage step, comprising the sending of a signal containing at least part of the code of the label which has just been identified.

3. A device for the remote identification of labels by an interrogation apparatus, the interrogation apparatus (1) and the labels (E) comprising signal transceivers (5, 10), converters (6, 7, 14, 15) converting the signals into logic information and vice versa, and means (8, 16) for logic information processing, the labels each comprising a distinctive code and a memory, and the interrogation apparatus comprising a signal catalogue, wherein the signal catalogue comprises a first signal for demanding the sending of the label codes by fragments in a first reading direction from most significant data, a prior signal for demanding the sending of the entire label code by at least one of the labels, a passage signal initiating a passage of information between the interrogating apparatus and a label which has just been identified, and a definitive signal for the definitive inhibition of the label which has just been identified;

wherein the signal catalogue comprises a second signal for demanding the sending of the label codes in fragments, in a second reading direction which is the reverse of the first reading direction.

4. A method for the remote identification of labels (E) provided with a distinctive code and situated in a field (2) of an interrogation apparatus (1), by sending and receiving signals between the interrogator and the labels comprising the following steps:

first identification step comprising an interrogation requiring the labels to send their complete codes and, if a single label is present in the interrogation field, an identification of the single label;

second identification step if a plurality of said labels are present in the interrogation field comprising successive interrogations requiring the labels to send their codes by respective fragments, wherein the interrogations involve a progressive selection of the labels according to the sent fragments, and labels that are not selected undergo a temporary inhibition until only one of the labels remains selected and is identified when all the fragments are interrogated;

information passage step of passing information between the interrogation apparatus and the label which has just been identified; and definitive inhibition step of definitively inhibiting the label which has just been identified;

wherein the labels can enter the field of the identification apparatus and leave it in a random fashion, and wherein the label identification step is undertaken alternatively in one code reading direction from most significant data and then another code reading direction from least significant data for each of the labels.

5. A method according to claim 4, wherein, the temporary inhibition consists in switching off a logical means present on each of the labels.

6. A method according to claim 5, wherein the temporary inhibition for each label is waived only when another one of the labels has been identified.

7. A method according to claim 4, wherein the selection consists in discarding the labels having code fragment values that do not match a particular value when other ones of the labels, which are selected, have code fragment values that match said particular value.

* * * * *

UNITED STATES PATENT AND TRADEMARK OFFICE
CERTIFICATE OF CORRECTION

PATENT NO. : 6,911,899 B1  
DATED : June 28, 2005  
INVENTOR(S) : Crochon et al.

It is certified that error appears in the above-identified patent and that said Letters Patent is hereby corrected as shown below:

<u>Column 4,</u>
Table 2, Line 38, in the "Action of the labels E" column,
please delete "1 is temporarily" and insert therefor -- E1 is temporarily --.

Signed and Sealed this

Fifteenth Day of November, 2005

JON W. DUDAS
*Director of the United States Patent and Trademark Office*